Figure 1:
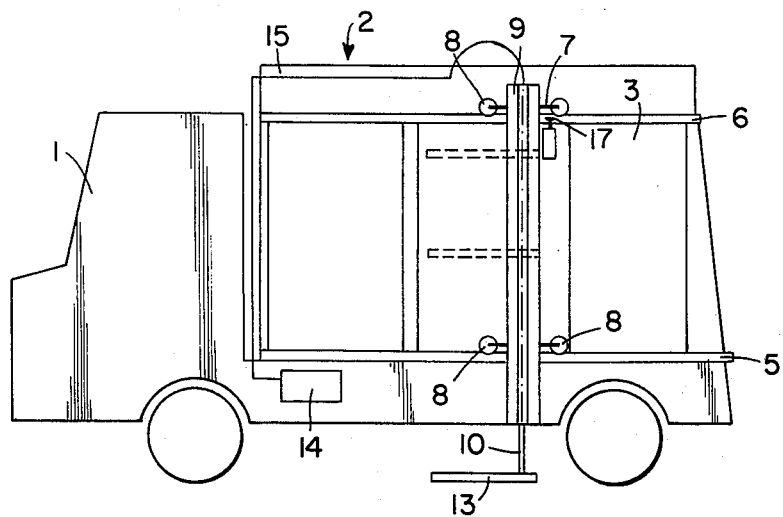

United States Patent [19]
Weber

[11] 3,971,483
[45] July 27, 1976

[54] MOTOR TRUCK
[76] Inventor: Walter Weber, Sanatoriumstrasse 25, Vienna 14, Austria
[22] Filed: June 11, 1973
[21] Appl. No.: 368,706

[30] Foreign Application Priority Data
June 23, 1972 Austria .............................. 5447/72

[52] U.S. Cl............................ 214/75 G; 214/16.4 A
[51] Int. Cl.².......................................... B60P 1/00
[58] Field of Search............. 214/75 R, 75 G, 75 H, 214/75 T, 357, 14, 16.4 B, 16.4 A, 16.4 R; 212/10, 141

[56] References Cited
UNITED STATES PATENTS

| | | | |
|---|---|---|---|
| 260,924 | 7/1882 | Bacci .................................. | 214/14 |
| 1,927,677 | 9/1933 | Bennington ................. | 214/16.4 B X |
| 3,368,704 | 2/1968 | Pope ................... | 214/75 T |
| 3,389,814 | 6/1968 | Lemelson........................... | 214/16.4 |
| 3,494,488 | 2/1970 | Morey.............................. | 214/16.4 B |
| R27,871 | 1/1974 | O'Connor ...................... | 214/16.4 A |

FOREIGN PATENTS OR APPLICATIONS

| | | | |
|---|---|---|---|
| 364,222 | 10/1962 | Switzerland....................... | 214/75 R |
| 1,210,575 | 10/1970 | United Kingdom............... | 214/75 G |

*Primary Examiner*—Robert J. Spar
*Assistant Examiner*—Jerold M. Forsberg
*Attorney, Agent, or Firm*—Karl F. Ross; Herbert Dubno

[57] ABSTRACT

The motor truck comprises means defining a cargo space having the configuration of a rectangle in a top-plan view, a vertically extending support which is mounted on the truck and guided on the body thereof for movement along at least one side of the rectangle. A load-handling platform is carried and guided by and vertically movable along this support.

1 Claim, 2 Drawing Figures

U.S. Patent  July 27, 1976  3,971,483

MOTOR TRUCK

This invention relates to a load-handling unit for motor lorries or trucks. The unit comprises a support and a load-handling platform which is guided on the support for up-and-down (vertical) movement. It is an object of the invention to enable loading or unloading at least of a major portion of the cargo space of the motor lorry or truck by means of a load-handling unit without the need for a complicated transfer of the cargo in the cargo space from or to the load-handling unit. Specifically, it is an object of the invention to provide a load-handling unit which enables simple loading and unloading of motor lorries or trucks which carry beverages. The load to be carried by such motor lorries or trucks for beverages consists of bottles in cases, and is accessible only from the outside of the cargo space. Because it is virtually impossible to transfer the cargo within the cargo space, the known load-handling units which require such transfer cannot be used.

The object is attained in that the support is slidably guided along at least one of the outer sides, preferably along three outer sides, of the cargo space of the motor lorry or truck. This feature of the invention enables a shifting of the load-handling unit to that portion of the cargo space which is to be unloaded or loaded.

The shifting of the support can be enabled by numerous means well known to a person skilled in the art. In a particularly desirable embodiment of the invention the support is provided with rollers, which are supported on rails, which are disposed in two (horizontal) planes and extend around the cargo space.

The support may be arranged to be shifted by hand. For a further relief of the operator it will be desirable to provide the support with a motor drive for shifting the support. This drive may consist of a friction wheel drive, which is provided with a hydraulic motor. It will also be desirable to form the support with a longitudinal slot through which an arm extends, which connects the load-handling platform to its lifting means, the load-handling platform being hinged to the arm. This very simple structure permits the load-handling platform to be tilted up when it is not used, particularly when the vehicle is travelling.

The invention will be described more fully hereinafter with reference to an embodiment shown by way of example in the accompanying drawing although the invention is not restricted to that embodiment.

Figure 2:
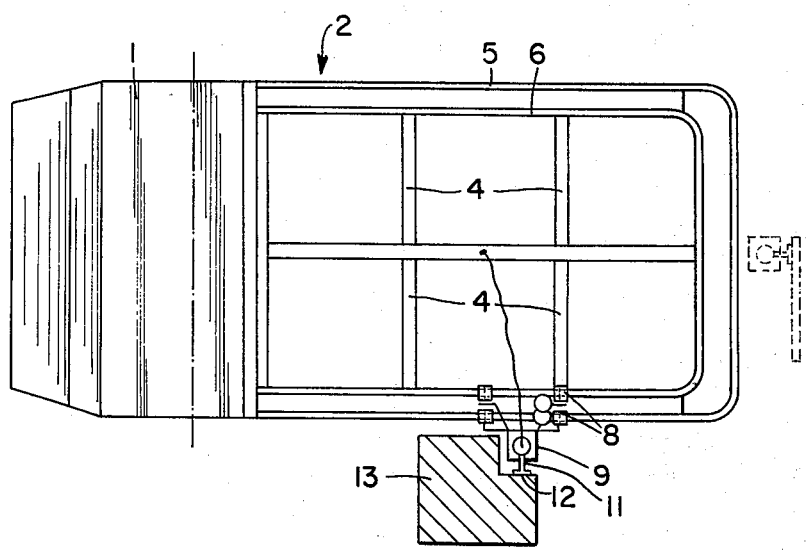

In the drawing:

FIGS. 1 and 2 are, respectively, an elevation and a top plan view showing diagrammatically a vehicle for carrying beverages which is provided with a load-handling unit according to the invention.

The motor lorry or truck 1 comprises in the usual manner a cargo space 2 of rectangular plan configuration, which is divided into several compartments by a longitudinal center wall 3 and transverse walls 4. These compartments of the cargo space 2 are accessible only from the outside and contain the cases which are filled with bottles.

Rails 5 and 6 are respectively disposed adjacent to and spaced above the bottom of the cargo space 2 and extend along three of the outer sides of the cargo space. A support 9 is mounted on these two rails 5 and 6 by means of rollers 8 secured to arms 7. Articulated joints connect the rollers to the arms 7 so that the support 9 can be pushed around the curved portions of the rails 5, 6.

The support 9 is provided with a longitudinal slot 10, through which an arm 11 extends. At its end disposed inside of the support 9, the arm is connected to a hydraulic lifting device or jack 12 of known type. A load-handling platform 13 is carried by the arm 11 at the other end thereof and is connected thereto by a hinge 12.

An electro-hydraulic unit 14 delivers through a conduit 15 pressure liquid for the lifting device 12 and a hydraulic motor 16. This motor is secured to the support 9 and drives a friction wheel 17, which is forced against the rail 6.

By means of a known control device, not shown, the friction wheel drive 16, 17 can be caused to shift the support 9 to the desired portion of the cargo space, and the platform 13 can be raised and lowered so as to move the cargo.

Numerous embodiments are possible within the scope of the invention. For instance, the support could be shifted, e.g., by ropes or chains, and could be supported by other means. The electro-hydraulic drive means could be replaced by motor-hydraulic drive means or strictly hydraulic drive means.

What is claimed is:

1. A motor truck comprising:
   a self-propelled motor-truck chassis having a cab at one end thereof;
   means on said chassis defining a cargo space of rectangular plan configuration rearwardly of said cab and accessible on three sides including the lateral sides and the rear of said cargo space;
   guide means including upper and lower rails each extending continuously around and adjacent the respective upper and lower edges of said three sides of said cargo space;
   a vertically extending support mounted on said guide means and having upper and lower rollers shiftable along said guide means on said three sides of said cargo space;
   a load-carrying platform mounted on said support;
   means for vertically displacing said platform relative to said support;
   a motor on said support and a drive wheel driven by said motor and engaging said guide means for displacing said support along said guide means,
   said support being provided with a vertically extending slot, said means for vertically displacing said platform including lifting means within said support, a substantially horizontally extending arm connected at one end to said lifting means and extending through said slot, and hinge means swingably mounting said platform to the other end of said arm for movement about a substantially horizontal axis to a substantially vertical storage position.

* * * * *